Nov. 22, 1955  L. BLOOM  2,724,211
TOY AIRCRAFT WING CONSTRUCTION
Filed May 24, 1952
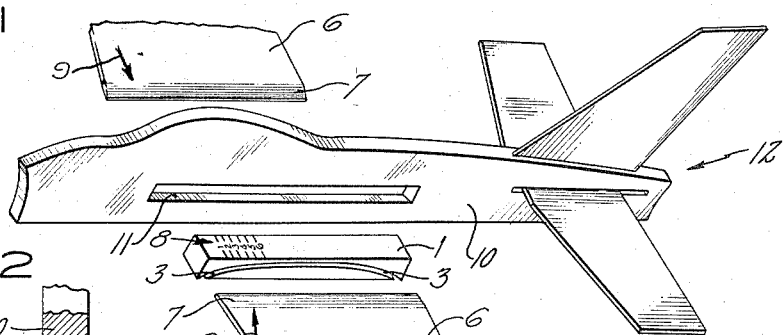
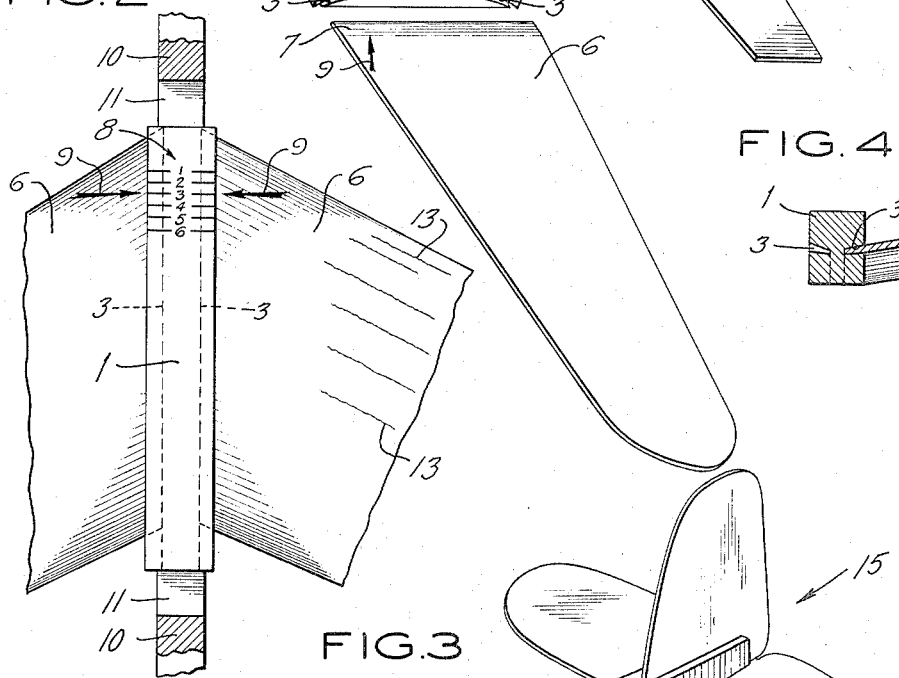
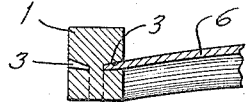
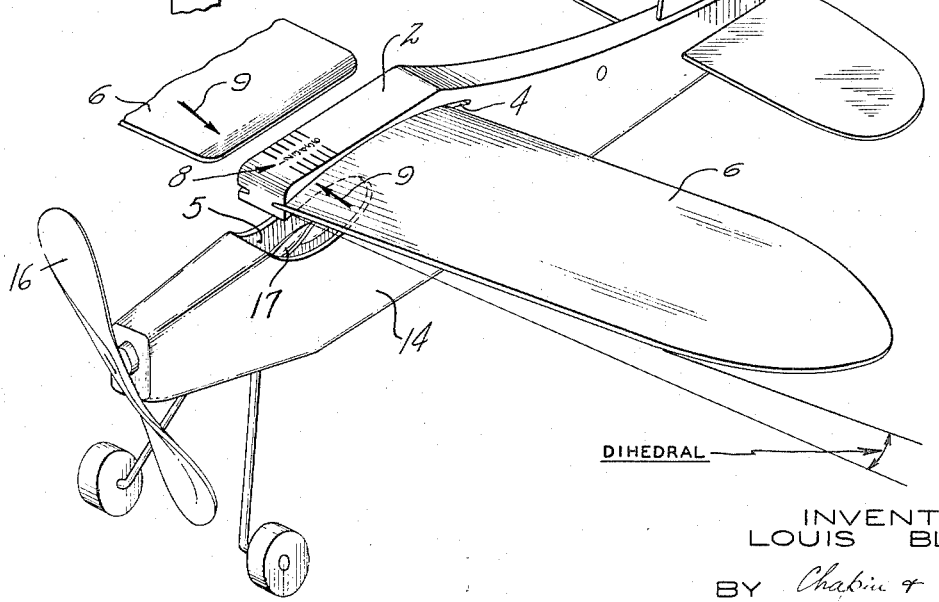
INVENTOR
LOUIS BLOOM
BY Chapin & Neal
ATTORNEYS

2,724,211

TOY AIRCRAFT WING CONSTRUCTION

Louis Bloom, Springfield, Mass.

Application May 24, 1952, Serial No. 289,759

1 Claim. (Cl. 46—79)

This invention relates to toy aircraft construction and has for a particular object to provide a novel wing structure for the same.

One object of the invention is to provide a simple and effective means for the user to control the lateral stability and performance of a toy aircraft in flight.

Another object is to provide a three part wing structure which enables the user to adjust the wing section elements thereof and test flight characteristics in order to obtain a particular type of performance desired.

A further object is to provide a structure in which camber and dihedral may be introduced into the wing sections of a toy aircraft by the act of assembling the same and may be predetermined by the manufacturer without preforming the wing sections at the time of manufacture.

A still further object is to provide a toy aircraft wing assembly easily assembled and dismantled by the user and of a construction having greater strength than prior art single wing constructions especially in wings provided with a sweepback.

Yet another object is to provide a construction in which the user by the act of assembling the wing structure automatically and instantly obtains camber and dihedral and may by adjustment eliminate the adverse effects of any normal warping of said wing sections.

These and other objects and advantages will be apparent from a consideration of the following description taken in conjunction with the accompanying drawings in which, Fig. 1 is an exploded view of a toy glider aircraft assembly embodying the wing construction of this invention;

Fig. 2 is a fragmentary top plan of the wing structure assembled in the glider of Fig. 1 with portions cut away;

Fig. 3 is a perspective view of an alternative form of the invention as embodied in a toy airplane; and Fig. 4 is a cross section to show details of construction of a body element to which wing sections are attached.

The assembly of this invention is characterized by provision for two pinions or wing sections adapted for assembly at their inner edges or roots in longitudinally disposed slots at the sides of a central body member. The body member may be an element separate from the fuselage of the aircraft and insertable therein. It may also be built into the fuselage or be formed as an integral part thereof. In Figs. 1 and 2 of the drawings the central body member 1 is separable from the fuselage itself. In Fig. 3 the body member at 2 is an integral part of the fuselage.

In the preferred construction of the invention a light wood such as balsa wood is used, although other materials such as aluminum, paper or plastic and the like having proper characteristics may be employed. Balsa wood is used because of its workability, weight factor, strength, and ability in thin sheets, as may be used for the wing sections, to be flexed and set into position.

Referring now to Figs. 1 and 2 the central body member 1 is formed with slots 3 cut longitudinally in the sides thereof and it will be noted (Fig. 1) that slots 3 are shaped with an arcuate camber curve from the bottom edge of the body 1 at the rear end to the bottom edge at the front end thereof. The ends of these slots are open, but either or both ends may be closed if desired. In the slot 4 of the form of Fig. 3 the body member is an integral part of the fuselage and the rear end of slot 4 is closed, while the front end of slot 4 is open at the front of a cockpit formation at 5 of the fuselage in this embodiment.

As clearly shown by Fig. 2 the inner end edges of the two pinions or wing sections 6 are of a shorter length than the length of the slots 3. The inner end edges of section 6 may also be tapered as at 7 and if desired the sides of slots 3 may be tapered for a frictional or press fit of said sections. Thus each may be removed and shifted forwardly and rearwardly in slot 3 relative to the body member 1 and the other wing section. For purposes of testing the flight characteristics of an assembly and making adjustments in the relative positioning of the wing sections numbered reference lines as at 8 are provided on the top of the member 1 and an arrow reference line 9 is imprinted on the top surface of each wing section 6. This enables the user to set the wing sections arbitrarily in a particular relation, make a trial flight to learn its behavior under such conditions, and to make adjustments in the positioning to compensate for or correct a faulty performance or to trim the wings for a straight or circular flight as may be desired.

It will be realized that by the forward or reverse shifting of the wing sections in the slots the angle of incidence of each wing section 6 of the glider or plane is changed and may be controlled to obtain lateral stability in flight. In the form of the glider shown by Fig. 1 wherein the fuselage 10 is formed with a slot 11 to receive the body 1, longitudinal stability may be achieved by shifting the member 1 forwardly and rearwardly in slot 11. The empennage of the glider may be of any usual construction and is indicated by the numeral 12.

In the embodiment of Figs. 1 and 2 the wing sections are joined to member 1 and member 1 inserted into slot 11 by a frictional press fit for test flying or for regular flying. It will be realized that the user may, if desirable, discover the proper relation of the parts for good flight performance and secure the wing sections, and member 1 to the fuselage 10, by any suitable cementing agent.

The separation of the wing element of a toy aircraft in three component parts in the manner disclosed has advantages for the manufacturer also. When made in three parts the wing sections are of smaller dimensions than the usual prior art single wing element and therefore can be compactly arranged in a smaller package unit. The sections 6 may be formed in a flat condition and the desired camber curve introduced on assembly of the wing unit into the arcuate slots cut or machined in the sides of member 1.

When the balsa wood or other flexible material is bent for insertion into the slots, the compression of the slot sides on the wing edges together with the tendency of the previously flat wings to retain their original state maintains a secure frictional grip to hold the assembly together. Additionally, any normal warpage which may have occurred in the wing sections while in transit or storage may be corrected by the mere flexing of the wings into position. If not corrected by assembling the unit, the effect of normal warpage may be eliminated by the shifting of one wing relative to the other. The user may thus make the necessary corrective adjustments for stability in flight. Stability in flight is also assisted by the fact that the camber curve is greatest adjacent the slot with the outer wing portions having a gradually flattened condition nearer the wing tips.

It will also be seen that the result of assembling wing sections into a central body member gives added strength and rigidity by providing a substantial "backbone" or core to the unit in contrast to many prior single wing constructions.

In Fig. 4 slots 3 of member 1 are shown as slightly tapered and may be formed as shown with a predetermined dihedral angle. Thus, if in any given aircraft a dihedral angle is desirable it may be predetermined with precision by the manufacturer and the user obtains the advantage thereof by the simple assembly operations. No preformation of a single wing element or elements is necessary. The dihedral angle of a wing thus provided may be seen clearly from Fig. 4.

A sweepback of the wing sections may also be accomplished in the construction disclosed and without loss of structural strength in the formation of this type of wing when made of wood. As indicated by grain lines as at 13 (Fig. 2) the grain of the wood may run substantially parallel to the longitudinal axis of the wing section or parallel to the leading edges thereof. Hence the leading edges of the wings will not be cut across the grain which would otherwise render the wing sections more easily subject to breakage.

In Fig. 3 the alternative embodiment shown discloses the body member 1 as an integral part of a fuselage 14 having a customary empennage indicated at 15 for a toy airplane with propeller 16 powered by a rubber band assembly 17 disposed longitudinally within fuselage 14.

What is claimed is:

In toy aircraft wing construction a central body member having in each side thereof a longitudinally disposed slot formed as a true arc throughout its entire length in combination with complementary wing sections of flexible material with the inner edges thereof of lesser length than the length of said slots, said wing sections being insertable in the slots in a plurality of longitudinal positions relative to said body member and having a fixed camber curve in any of said positions, each said section being independently adjustable relative to said member and to said other wing section whereby the lateral stability of a toy aircraft may be controlled by separately adjusting the angle of incidence of each wing section.

References Cited in the file of this patent

UNITED STATES PATENTS

| 1,572,166 | Smith | Feb. 9, 1926 |
| 1,792,779 | Tarr | Feb. 17, 1931 |
| 2,253,661 | Teuschler | Aug. 26, 1941 |
| 2,551,340 | Sands | May 1, 1951 |

FOREIGN PATENTS

| 605,141 | Great Britain | July 16, 1948 |